Aug. 31, 1965                D. L. BRUNT                3,203,724
                    PNEUMATICALLY CUSHIONED BUMPER
Filed Aug. 30, 1963                              2 Sheets-Sheet 1

INVENTOR
*David L. Brunt.*

Aug. 31, 1965  D. L. BRUNT  3,203,724
PNEUMATICALLY CUSHIONED BUMPER
Filed Aug. 30, 1963  2 Sheets-Sheet 2

INVENTOR
*David L. Brunt.*

United States Patent Office 3,203,724
Patented Aug. 31, 1965

3,203,724
PNEUMATICALLY CUSHIONED BUMPER
David L. Brunt, 725 S. Shore Road, Jacksonville, Fla.
Filed Aug. 30, 1963, Ser. No. 305,644
1 Claim. (Cl. 293—89)

This invention relates to the automobile industry, and more particularly, to a device in this industry to be mounted on an automobile between the bumper and the frame of the vehicle, to absorb any impact on the bumper.

While any number of different types of devices have admittedly been developed to accomplish the same purpose as this invention, they all seem to have noticeable defects that prevent them from being entirely satisfactory to their user. The devices now on the market are usually called shock absorbers, and have either a spring-loaded mechanism or hydraulic fluid as their shock resisting medium.

It is, therefore, the concomitant object of this invention to provide an air-operated device for automoible bumpers and the like that does not contain any springs or other complicated parts that wear out, and/or require more or less continued adjustment for efficient operation.

Another object of this invention is to provide an air-operated device for automobile bumpers and the like that can readily be manufactured by any company already producing air-operated shock absorbers with little or no alteration in their equipment and in its use.

Another object of this invention is to provide an air-operated device for automoible bumpers and the like that can readily be installed on any existing vehicle with a minimum of effort.

Another object of this invention is to provide an air-operated device for automobile bumpers that can be installed on both the back and the front bumper with equal ease and operating efficiency.

Still another object of this invention is to provide an air operated device for automobile bumpers that will receive its air from one centrally located supply tank on which a gage is mounted to give the operator of the vehicle instant assurance of the air pressure that will prevent serious damage to the vehicle should its bumpers come into sudden contact with another object.

Further objects and advantages of the invention will be apparent from the following description taken in conjunction with the drawings, wherein.

Figure 1:
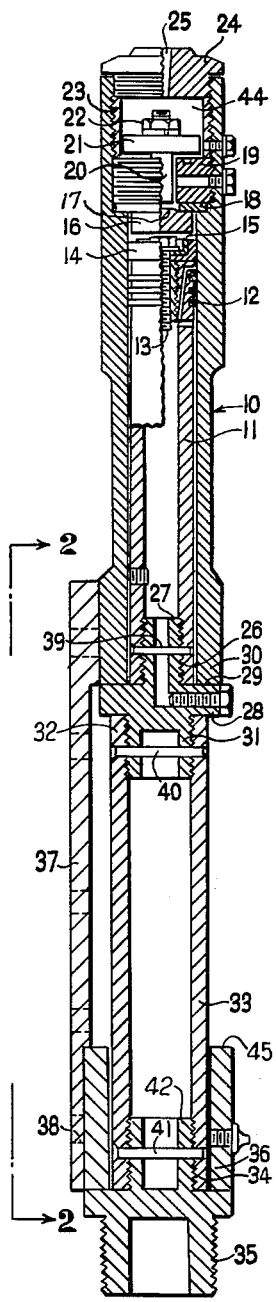
FIGURE 1 is a longitudinal sectional view of this invention ready for installation on an automobile.
Figure 2:
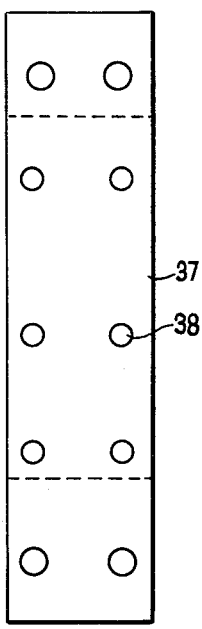
FIGURE 2 is a side view of the mounting plate that secures this invention to an automobile.
Figure 4:
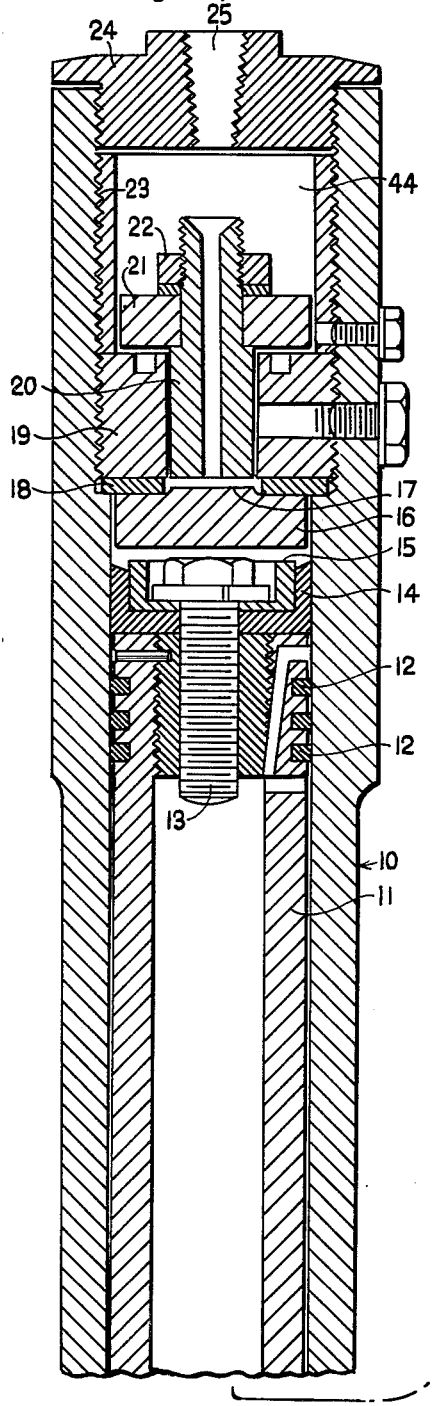
FIGURE 4 is an enlarged longitudinal sectional view of that end of this invention which is adapted to receive the air from its supply cylinder.
Figure 5:
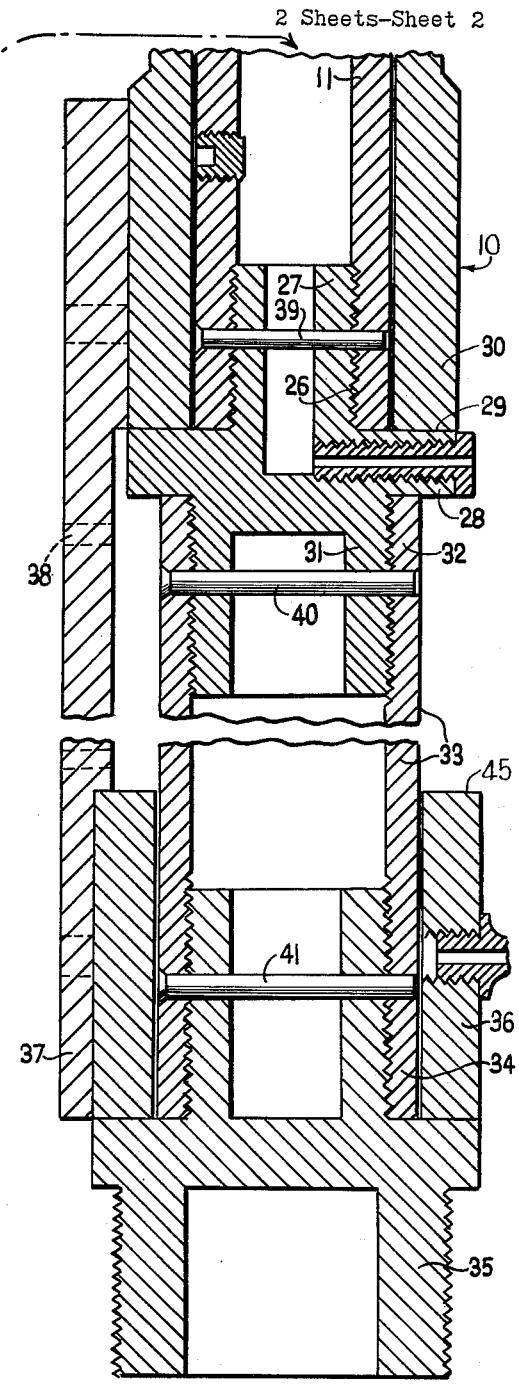
FIGURE 5 is an enlarged longitudinal sectional view of that end of this invention to which is attached the bumper of the automobile.

Referring now to FIGURES 1, 4, and 5, it will be seen that this assembled invention comprises cylinder 10, having a piston 11, one end of which is provided with a plurality of equally spaced piston rings 12, and a centrally and longitudinally located bolt 13, which secures the compression cup 14 and the metal holding cup 15 in place on that end of the aforesaid piston 11 on the top of the aforesaid cups, on which is located a free-floating piston 16, which has a raised centrally located portion 17 that normally rests inside of the ring 18, on top of which is screwed a plug 19, that has a centrally located longitudinal passage in which is located a longitudinally movable plug 20, over one end of which is located a thick washer 21 that is held in place by a washer and nut 22. An externally threaded sleeve 23 has its lower end resting on top of the aforesaid plug 19, as best shown in FIGURE 4 where it is also seen that this end of the cylinder 10 is capped with a threaded plug 24, having an internally threaded and centrally located opening 25 therein, in which is suitably secured a fitting that connects this invention with a source of air under pressure. This is usually in the form of an air tank (not shown in the drawings) having a ninety pound air pressure.

Looking now at the mid-section of FIGURE 1 of the drawing, it will be seen that the aforesaid piston 11, has its lower end 26 provided with internal threads, in which is screwed a plug 27, having a jam ring 28 integral therewith and which has one face 29 normally against the end 30 of the aforesaid cylinder 10. The externally threaded end 31, of the aforesaid plug 27, is screwed into one end 32 of cylinder 33, which has its other end 34 internally threaded to receive the screwed fitting 35, while a sleeve 36 encompasses the aforesaid end 35 of cylinder 33. The aforesaid sleeve 36 is suitably secured to one end of the rectangular mounting plate 37, that has its other end suitably secured to the end 30 of the aforesaid cylinder 10. The rectangular mounting plate 37 is secured to the front side frame of any automobile frame by a plurality of bolts projecting through the circular openings 38.

Looking once more at FIGURES 1 and 5, one will see that a plurality of rivets have been placed in this invention to doubly insure the device against any accidental error in assembly. Rivet 39 secures the screwed plug 27 in the lower end 26 of piston 11, while rivet 40 secures the other end of the same plug 27 in one end 32 of cylinder 33, and rivet 41 secures the screwed end 42 of the fitting 35 into the other end 34 of the aforesaid cylinder 33, thus preventing this device from becoming accidentally disassembled.

It will be realized by anyone experienced in any of the mechanical arts, that it is not absolutely necessary that every piece of this invention be described in detail and characterized on the drawing; therefore, certain obvious parts of this invention are neither mentioned in this specification nor characterized by a reference numeral on the drawings, since to add this material would only result in confusion when reading this specification and the appended claim.

Figure 3:
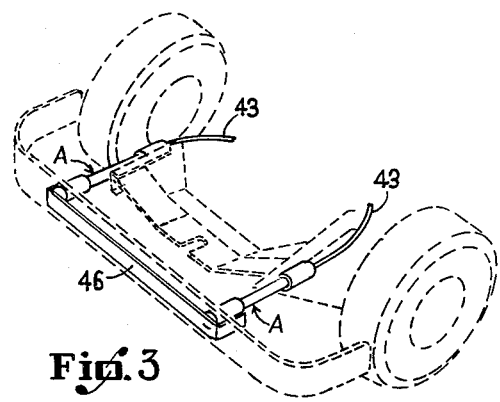
FIGURE 3 is a pictorial view of the front end of a typical automobile with this invention secured to its bumper. Only the invention and its attaching bar are shown in solid lines.

The way in which this invention works is indeed quite simple. The entire device, of which there are two, secured to the front bumper 46 of the automobile, is clearly shown in FIGURE 3 of the drawings. The entire device is characterized by the reference character A on the drawings. One end of an air line 43 is connected to the center of the threaded plug 24, while the other end of the same air line is connected to an air tank, not shown in the drawings, which will supply a ninety pound air pressure to this invention through the aforesaid opening 25. The air, under pressure, entering chamber 44, will push the thick washer 21 and plug 20 downward against the plug 19, and the air will also push against the loosely fitting free floating piston 16, then against the metal holding cup 15, the compression cup 14, the piston 11, its jam ring 28, and cylinder 35, to the point whereby the aforesaid jam ring 28 is resting against the end 45 of the sleeve 36. When this happens, the end 34 of the aforesaid cylinder 33, and the fitting 35, to which the bumper 46 is suitably attached, will be at a predetermined distance away from the aforesaid sleeve 36. Now, when the bumper 46 suddenly contacts any non-giving structure, such as a fixed object or another vehicle, the compressed air within this device will move element 16 into contact with ring 18, to trap the compressed air in cylinder 10. This compressed air will ease the shock into the structural frame of the automobile. It may be well to note that a pressure of ninety pounds per square inch is recommended for the best operation of this invention.

It will be apparent to those skilled in the art that various changes may be made in the invention, without departing from the spirit and scope thereof, and therefore the invention is not limited by that which is shown in the drawings and described in the specification, but only as indicated in the appended claim.

What I claim is:

A bumper assembly for automotive vehicles, comprising a bumper member and a pair of spaced supports extending from adjacent the ends of the bumper member, each said support comprising a cylinder and a piston slidable in the cylinder between extended and retracted positions, and one-way valve means permitting free flow of fluid into the cylinder upon movement of the piston toward an extended position but blocking flow of fluid out of the cylinder upon movement of the piston toward a retracted position, the cylinder having an internally screw-threaded inlet end, the internal screw threads of said inlet end terminating in an inwardly extending shoulder, an externally screw-threaded plug having an axial bore therethrough, said plug being in screw-threaded engagement with said internal screw threads of said inlet end, a flat annular ring secured between said plug and said shoulder and extending radially inwardly from said shoulder, said ring comprising a valve seat for said one-way valve means, said one-way valve means including a valve member in the form of a circular disc disposed on the piston side of said ring, said disc having an outer annular surface disposed in a plane perpendicular to the axis of said disc and contacting said radially inwardly extending portion of said ring in the closed position of said one-way valve means, said disc having a raised central portion that extends away from the piston on the side of the disc opposite the piston and that extends into the central opening of said annular ring and that is bordered by a circular beveled edge of a diameter substantially as great as the internal diameter of said annular ring.

References Cited by the Examiner

UNITED STATES PATENTS

| | | | |
|---|---|---|---|
| 1,504,505 | 8/24 | Reed et al. | 293—85 X |
| 1,925,461 | 9/33 | Ridge | 293—86 |
| 2,461,066 | 2/49 | Kent | 267—34 |
| 2,555,436 | 6/51 | Druilhet | 293—85 |
| 2,977,146 | 3/61 | Edwards et al. | 293—86 X |
| 3,008,746 | 11/61 | Senger | 293—86 X |
| 3,134,619 | 5/64 | Harrison | 293—73 X |
| 3,145,055 | 8/64 | Carter | 293—85 X |
| 3,145,056 | 8/64 | Blahnik | 293—85 X |

MILTON BUCHLER, *Primary Examiner.*

LEO QUACKENBUSH, *Examiner.*